UNITED STATES PATENT OFFICE.

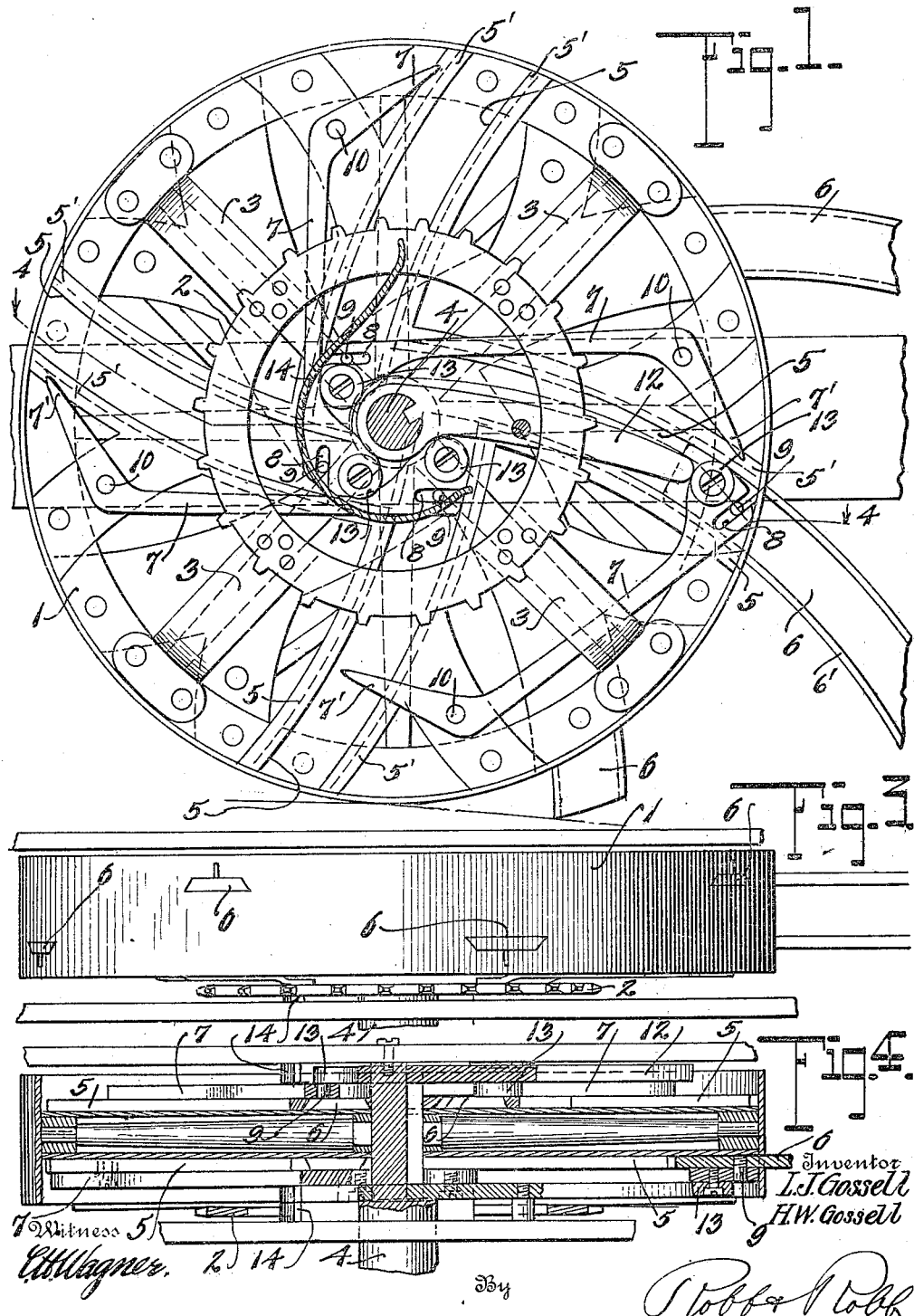

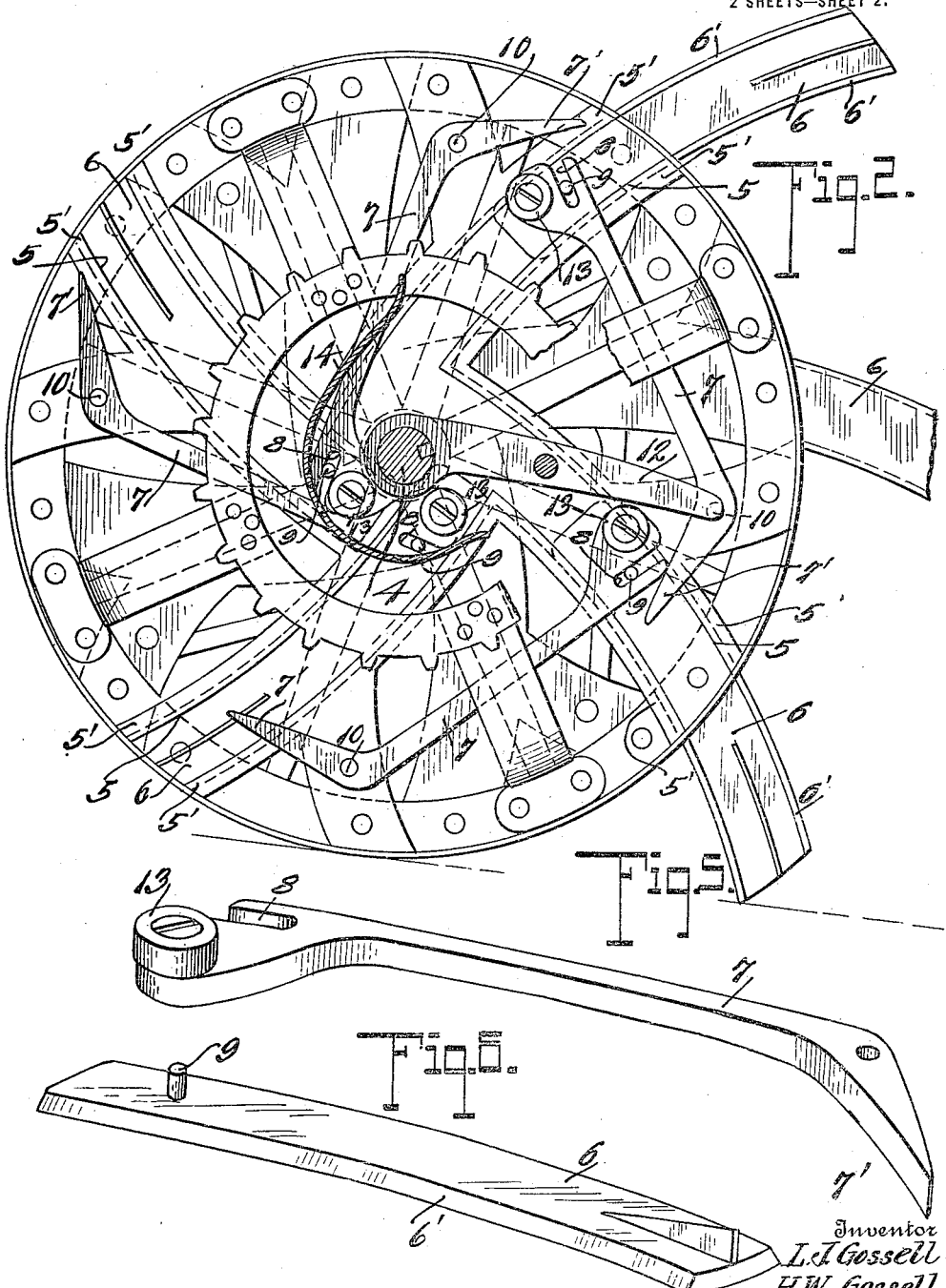

LOUIS J. GOSSELL AND HENRY W. GOSSELL, OF NEAR VERNDALE, MINNESOTA.

TRACTION-WHEEL.

1,271,887.     Specification of Letters Patent.     Patented July 9, 1918.

Application filed May 2, 1917. Serial No. 165,973.

*To all whom it may concern:*

Be it known that we, LOUIS J. GOSSELL and HENRY W. GOSSELL, citizens of the United States, residing near Verndale, in the county of Todd and State of Minnesota, have invented certain new and useful Improvements in Traction-Wheels, of which the following is a specification.

The present invention relates to improvements in traction wheels, the object in view being to provide a construction of wheel which embodies a series of movably mounted surface engaging members actuated automatically as the wheel revolves to successively engage the ground at a point adjacent to the peripheral contact of the wheel therewith so as to materially increase the effective tractive effort exerted by said wheel.

Another object is to so operate the said movable members that they will progressively project from the peripheral portion of the wheel in increasing extent so as to maintain said members in their relative surface engaging position as the wheel revolves and the point of peripheral contact of said wheel moves away from said position, thus increasing to a maximum the line of traction.

Without defining all the other various objects, the invention consists of the aforesaid movable surface engaging members, relatively stationary means for actuating said members to move them into operative position, and means coöperating with the engaging members so arranged as to cause the movement of a second engaging member when it has completed its function into an inoperative retracted position, and it is further contemplated to employ certain other means for retaining said engaging members in their retracted positions until they are brought into proper relation with respect to the actuating means for operation thereby.

With the above and other objects in view, this invention consists in the construction, combination and arrangement of parts all as hereinafter more fully described, claimed and illustrated in the accompanying drawings, in which:

Figure 1 is a side elevation of a device embodying the present invention and showing one of the surface engaging members at its preliminary surface engaging position, and a second of said members at its maximum extended position.

Fig. 2 is a similar view to Fig. 1, but showing one of the surface engaging members about to be retracted by its succeeding surface engaging member as it moves into its extended position with reference to the wheel.

Fig. 3 is a top plan view of the wheel.

Fig. 4 is a horizontal sectional view taken about on the plane indicated by the line 4—4 of Fig. 1.

Fig. 5 is a detail perspective view of the operating arm for the surface engaging member; and Fig. 6 is a detail perspective view of one of the surface engaging members.

Throughout the following detail description and on the several figures of the drawings, similar parts are referred to by like reference characters.

Referring to the drawings, and specifically describing the invention, 1 designates a wheel of suitable construction having attached thereto the driving sprocket 2 supported preferably from the peripheral portion of the wheel by suitable brackets 3 through which the motive power imparts movement to the wheel. The wheel is mounted upon the dead axle 4 and at each side the wheel is provided with a series of slightly curved, substantially radially extending guideways 5, the edges of which are provided with spaced flanges 5', and in each of these ways is slidably mounted a surface engaging member 6, the edges of which are beveled as indicated at 6', so as to properly coöperate with the undercut flanges 5'. Normally the inner ends of these surface engaging members lie adjacent to the central portion of the wheel and each has connected to said inner extremity an operating arm 7 the connecting end of which is slotted as indicated at 8 to receive the pin 9 on the surface engaging member. At its opposite end, each of these arms is pivotally mounted, adjacent to the peripheral portion of the wheel, as indicated at 10, the guideways 5 having a laterally extending branch 11 constituting the support for said arms. These arms practically constitute levers as they have a foot extension 7' which operates directly adjacent to a contiguous guideway 5 and in one position the said foot extension lies in the path of movement of the connected end of the arm attached to the surface engaging member which operates in the guideway just referred to, and as will hereinafter be more particularly pointed out is actuated thereby.

Secured to the axle 4, and extending radially of the wheel, is a member, which, for the purposes of this description, we term an actuating means, said means consisting of an elongated member or cam 12 which is relatively stationary. In the operation of this device the surface engaging members are operated through the instrumentality of this cam member, as will now be more particularly described.

The operation of the traction wheel is substantially as follows:

As the wheel moves contra-clockwise in Fig. 1, the inner extremity of an arm 7 is brought into contact with the cam member 12 adjacent to the axle 4 and continuous rotation of the wheel causes this end to slide or operate along the under surface of said cam toward the outer extremity, and to facilitate this sliding action the arm is provided with a roller bearing 13. The movement of this arm along the cam swings said arm about its pivot 10 and such movement of the arm causes the surface engaging member connected therewith to be projected from the periphery of the wheel. The projection takes place preliminarily approximate to the point of peripheral contact of the wheel with the surface of the ground, as indicated in Fig. 1, and this position of the surface engaging member is maintained by the progressive extension of said surface engaging member as the wheel revolves under the action of its operating arm 7 so that the point of peripheral contact of the wheel with the ground moves away from the point of engagement of the surface engaging member with the ground and thereby the line of traction is extended quite considerably for a determined extent of movement of the traction wheel. As soon as the inner end of the arm 7 reaches the end of the member 12, it is freed and further extension of the surface engaging member connected therewith is discontinued.

The swinging of the arm in the manner above described brings the foot extension 7' thereof into a position in the path of movement of the inner end of the next succeeding arm 7 and as indicated in Fig. 2 this foot extension is then impinged by the arm with the result that the surface engaging member connected therewith is impelled inwardly or retracted into its initial inoperative position.

We provide means for maintaining said surface engaging members in their inoperative positions until the proper time for their projection or extension from the wheel as above described, and such means consists of the semi-circular shell or retaining member 14 attached in any desired way to the vehicle so as to be relatively stationary. The inner ends of the arms 7 operate in this retaining member and are held thereby until they reach a point substantially beneath the inner end of the cam member 12, whereupon they become operative by said member in the manner above described.

As hereinbefore premised, each traction wheel is provided with a set of these operating devices at each side so that the surface engaging members of the respective sides lie in spaced staggered positions relatively as most clearly shown in Fig. 3 of the drawings. The result is that when the surface engaging member, at one side is about to engage the ground the surface engaging member at the other side is in its full extended position ready to be retracted by the next succeeding arm of the following surface engaging member.

Having thus described our invention, what we claim as new is:

1. A traction wheel of the class described comprising a surface engaging member movably mounted thereon, operating means pivotally connected with the engaging member for movement therewith as the latter moves into operative position, and means for causing the engaging member to move into such operative position, the operating means being operable to shift the engaging member into inoperative position after the performance of its tractive function.

2. A traction wheel of the class described comprising a plurality of surface engaging members, means for actuating each of said members in turn as the wheel revolves, and means operatively connected at one end to an engaging member and having its other end disposed adjacent to an adjacent engaging member for actuation as the latter is moved into operative position to thereby move the engaging member connected therewith into inoperative position.

3. A traction wheel of the class described comprising a plurality of surface engaging members movably mounted on the wheel, means for actuating said members in turn to move the same into operative position, and means operable with each surface engaging member under the control of the actuating means so arranged as to engage the corresponding means of another surface engaging member to effect movement of the second mentioned surface engaging member into inoperative position.

4. A traction wheel of the class described, comprising a series of surface engaging members movably mounted for successive engagement with the surface of the ground as the wheel revolves, a member arranged adjacent to each surface engaging member connected at one end with the engaging member and at its other end with the wheel, the last mentioned end being disposed contiguous to the next adjacent member and in its path of movement for actuation thereby, whereby as one of said surface engaging members is moved into operative position the adjacent surface engaging member is moved into inoperative position, and actuating means for said surface engaging members.

5. A traction wheel of the class described, comprising a series of surface engaging members movably mounted on the wheel, an arm connected to each of said members at one end and having pivoted connection with the wheel at the other end, and a relatively stationary member arranged in the path of movement of said arms and successively engageable thereby, for projecting said engaging members from the periphery of the wheel, each of said arms constituting a retracting means for a contiguous engaging member.

6. A traction wheel of the class described, comprising a series of surface engaging members movably mounted on the wheel, an arm connected to each of said members at one end and having pivoted connection with the wheel at the other end, and a relatively stationary member arranged in the path of movement of said arms and successively engageable thereby for projecting said engaging members from the periphery of the wheel, the pivoted end of each arm being disposed in the path of movement of the next adjacent arm for impingement by the latter as the surface engaging member connected therewith moves into projected position whereby to retract each engaging member successively from its operative position.

7. A traction wheel of the class described comprising movably mounted surface engaging members, means for actuating said members to move them into operative position, separate means for actuating the members to move them into inoperative position subsequent to the performance of their tractive function, and retaining means for holding the surface engaging members in inoperative position during a portion of the revolution of the wheel.

8. A traction wheel of the class described comprising a plurality of surface engaging members movably mounted on the wheel, means for actuating said members in turn to move the same into operative position, means whereby movement of an engaging member into operative position effects movement of a second engaging member into inoperative position, and retaining means for holding the surface engaging members in inoperative position during a portion of the revolution of the wheel.

9. A traction wheel of the class described comprising a series of surface engaging members, projecting means therefor, and means carried by each of the engaging members engageable with the projecting means for causing movement of said members into extended operative position, each said means being engaged by a preceding one to retract the engaging member into inoperative position.

In testimony whereof we affix our signatures.

LOUIS J. GOSSELL.
HENRY W. GOSSELL.

Copies of this patent may be obtained for five cents each, by addressing the "Commissioner of Patents, Washington, D. C."